(12) United States Patent
Kim et al.

(10) Patent No.: US 11,791,474 B2
(45) Date of Patent: Oct. 17, 2023

(54) ELECTROLYTE MEMBRANE FOR FUEL CELLS INCLUDING HYDROGEN PEROXIDE GENERATING CATALYST AND HYDROGEN PEROXIDE DECOMPOSING CATALYST, AND METHOD OF MANUFACTURING THE SAME

(71) Applicants: HYUNDAI MOTOR COMPANY, Seoul (KR); KIA MOTORS CORPORATION, Seoul (KR)

(72) Inventors: Byoungsu Kim, Yongin-si (KR); Bo Ki Hong, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 170 days.

(21) Appl. No.: 17/078,415

(22) Filed: Oct. 23, 2020

(65) Prior Publication Data

US 2021/0135242 A1   May 6, 2021

(30) Foreign Application Priority Data

Oct. 30, 2019   (KR) .................. 10-2019-0136124

(51) Int. Cl.
*H01M 4/90*   (2006.01)
*H01M 4/92*   (2006.01)
(Continued)

(52) U.S. Cl.
CPC ......... *H01M 4/9083* (2013.01); *H01M 4/881* (2013.01); *H01M 4/9041* (2013.01);
(Continued)

(58) Field of Classification Search
CPC .......................................... H01M 8/10–8/1097
See application file for complete search history.

(56) References Cited

U.S. PATENT DOCUMENTS

| 9,847,533 B2 | 12/2017 | Berta et al. |
| 2004/0043283 A1* | 3/2004 | Cipollini ............... H01M 4/921 |
| | | 429/465 |
| 2011/0244340 A1* | 10/2011 | Cipollini ............. H01M 4/9041 |
| | | 429/409 |

FOREIGN PATENT DOCUMENTS

| JP | 5169025 B2 | 3/2013 |
| KR | 2008-0047574 A | 5/2008 |

(Continued)

OTHER PUBLICATIONS

D. E. Curtin et al., "Advanced materials for improved PEMFC performance and life," Journal of Power Sources, vol. 131, pp. 41-48 (2004).

(Continued)

*Primary Examiner* — Jonathan Crepeau
(74) *Attorney, Agent, or Firm* — MCDONNELL BOEHNEN HULBERT & BERGHOFF LLP

(57) ABSTRACT

The present disclosure relates to an electrolyte membrane for fuel cells including a hydrogen peroxide generating catalyst and a hydrogen peroxide decomposing catalyst, the electrolyte membrane exhibiting highly improved durability, and a method of manufacturing the same. Specifically, the electrolyte membrane includes a support and a catalyst particle including a catalyst metal supported by the support, the catalyst metal including one selected from the group consisting of a first metal having catalyst activity to generate hydrogen peroxide, a second metal having catalyst activity to decompose hydrogen peroxide, and a combination thereof.

16 Claims, 13 Drawing Sheets

(51) Int. Cl.
| | |
|---|---|
| H01M 4/88 | (2006.01) |
| H01M 8/1004 | (2016.01) |
| H01M 8/1053 | (2016.01) |
| H01M 8/1069 | (2016.01) |
| H01M 8/1051 | (2016.01) |
| H01M 8/1046 | (2016.01) |

(52) U.S. Cl.
CPC ......... *H01M 4/9075* (2013.01); *H01M 4/921* (2013.01); *H01M 4/925* (2013.01); *H01M 4/926* (2013.01); *H01M 8/1004* (2013.01); *H01M 8/1046* (2013.01); *H01M 8/1051* (2013.01); *H01M 8/1053* (2013.01); *H01M 8/1069* (2013.01)

(56) References Cited

FOREIGN PATENT DOCUMENTS

| KR | 2016-0140732 A | | 12/2016 |
|---|---|---|---|
| WO | WO 2007050084 | * | 5/2007 |

OTHER PUBLICATIONS

A. P. Young et al., "Ionomer Degradation in Polymer Electrolyte Membrane Fuel Cells," Journal of Electrochemichal Society, vol. 157, pp. B425-B436 (2010).

P. Trogadas et al., "Degradation Mitigation in Polymer Electrolyte Membranes Using Cerium Oxide as a Regenerative Free-Radical Scavenger," Electrochemical and Solid-State Letters, vol. 11, pp. B113-B116 (2008).

R. Uegaki et al., "Radical-induced degradation mechanism of perfluorinated polymer electrolyte membrane," Journal of Power Sources, vol. 196, pp. 9856-9861 (2011).

D. Zhao et al., "Cesium substituted 12-tungstophosphoric (CsxH3-xPW12O40) loaded on ceria-degradation mitigation in polymer electrolyte membranes,"Journal of Power Sources, vol. 190, pp. 301-306 (2009).

R. W. Cahn et al., Materials Science and Technology, Chapter 10, Wiley-VCH Verlag, GmBH (2000).

E. Endoh, "Development of Highly Durable PFSA Membrane and MEA for PEMFC Under High Temperature and Low Humidity Conditions," ECS Transactions, vol. 16, pp. 1229-1240 (2008).

W. Vielstich et al. , Handbook of Fuel Cells—Fundamentals, Technology and Applications, John Wiley & Sons, Ltd. Mar. 2003 Abstract Only.

D. Banham et al., "Effect of CeOx Crystallite Size on the Chemical Stability of CeOx Nanoparticles," Journal of the Electrochemical Society, vol. 161, pp. F1075-F1080 (2014).

Y. Zhu et al., "Enhanced chemical durability of perfluorosulfonic acid membranes through incorporation of terephthalic acid as radical scavenger," Journal of Membrane Science, vol. 432, pp. 66-72 (2013).

M. A. Hasan et al., "Promotion of the hydrogen peroxide decomposition activity of manganese oxide catalysts," Applied Catalysis A: General, vol. 181, pp. 171-179 (1999).

D. Zhao et al., "MnO2/SiO2—SO3H nanocomposite as hydrogen peroxide scavenger for durability improvement in proton exchange membranes," Journal of Membrane Science, vol. 346, pp. 143-151 (2010).

L. Gubler and W. H. Koppenol, "Kinetic Simulation of the Chemical Stabilization Mechanism in Fuel Cell Membranes Using Cerium and Manganese Redox Couples," Journal of the Electrochemical Society, vol. 159, pp. B211-B218 (2012).

P. Trogadas et al., "Degradation mitigation in PEM fuel cells using metal nanoparticle additives," Journal of Materials Chemistry, vol. 21, pp. 19381-19388 (2011).

M. Aoki et al et al., "Decomposition mechanism of perfluorosulfonic acid electrolyte in polymer electrolyte fuel cells," Electrochemistry Communications 8, pp. 1509-1513 (2006).

N. Macauley et al., "Pt Band Formation Enhances the Stability of Fuel Cell Membranes," ECS Electrochemistry Letters, vol. 2(4), pp. F33-F35 (2013).

M. Watanabe et al., "Analyses of Self-Humidification and Suppression of Gas Crossover in Pt-Dispersed Polymer Electrolyte Membranes for Fuel Cells," J. Electrochem. Soc., vol. 145, pp. 1137-1141 (1998).

D. Zhao et al., "The effect of Platinum in a Nafion membrane on the durability of the membrane under fuel cell conditions," Journal of Power Sources, vol. 195, pp. 4606-4612 (2010).

V. Atrazhev et al., "Aspects of PEMFC Degradation," ECS Transactions, vol. 1(8), pp. 239-246 (2006).

Atrazhev et al., "The potential of catalytic particle in ion exchange membrane," Journal of Electroanalytical Chemistry, vol. 601, pp. 251-259 (2007).

Sanchez-Sanchez and Bard et al., "Hydrogen Peroxide Production in the Oxygen Reduction Reaction at Different Electrocatalysts as Quantified by Scanning Electrochemical Microscopy," Anal. commun., vol. 81, pp. 8094-8100 (2009).

McKee et al., "Catalytic Decomposition of Hydrogen Peroxide by Metals and Alloys of the Platinum Group," Journal of Catalysis, vol. 14, pp. 355-364 (1969).

* cited by examiner

ELECTROLYTE MEMBRANE FOR FUEL CELLS INCLUDING HYDROGEN PEROXIDE GENERATING CATALYST AND HYDROGEN PEROXIDE DECOMPOSING CATALYST, AND METHOD OF MANUFACTURING THE SAME

CROSS REFERENCE TO RELATED APPLICATIONS

This application claims, under 35 U.S.C. § 119(a), the benefit of priority to Korean Patent Application No. 10-2019-0136124 filed on Oct. 30, 2019, the entire contents of which are incorporated herein by reference.

BACKGROUND

(a) Technical Field

The present disclosure relates to an electrolyte membrane for fuel cells including a hydrogen peroxide generating catalyst and a hydrogen peroxide decomposing catalyst, the electrolyte membrane exhibiting highly improved durability, and a method of manufacturing the same.

(b) Background Art

In general, a polymer electrolyte membrane fuel cell (PEMFC) is used as a fuel cell for vehicles. In order for the polymer electrolyte membrane fuel cell to normally exhibit a high output performance of at least several tens of kW under various driving conditions of a vehicle, the polymer electrolyte membrane fuel cell must be stably operated within a wide range of current density.

Reaction for generation of electricity in the fuel cell occurs at a membrane-electrode assembly(MEA) including a perfluorinated sulfonic acid (PFSA) ionomer-based electrolyte membrane and an anode/cathode. Hydrogen supplied to the anode, which is an oxidation electrode, is divided into protons and electrons. The protons move to the cathode, which is a reduction electrode, through the membrane, and the electrons move to the cathode through an external circuit. At the cathode, oxygen molecules, the protons, and the electrons react with each other to generate electricity, and water ($H_2O$) and heat are generated as reaction byproducts.

Hydrogen and oxygen, which are reaction gases of the fuel cell, may cross over in the electrolyte membrane. At this time, hydrogen peroxide (HOOH) may be generated. When the hydrogen peroxide (HOOH) is decomposed into oxygen-containing radicals, such as a hydroxyl radical (.OH) and a hydroperoxyl radical (.OOH), the radicals attack the electrolyte membrane, whereby chemical degradation of the electrolyte membrane is caused and eventually durability of the fuel cell is reduced.

A method of adding various kinds of antioxidants to the electrolyte membrane is used as a means for mitigating chemical degradation of the electrolyte membrane. The antioxidants include a primary antioxidant having the function of a radical scavenger or quencher and a secondary antioxidant having the function of a hydrogen peroxide decomposer.

A representative primary antioxidant used in the electrolyte membrane for polymer electrolyte membrane fuel cells includes cerium- or terephthalic acid-based antioxidants, such as cerium oxide or ceria and cerium (iii) nitrate hexahydrate.

The cerium oxide may be mainly classified into pure cerium oxide($CeO_2$) and modified cerium oxide(modified $CeO_2$). The modified cerium oxide includes cerium-zirconium oxide ($CeZrO_x$), cerium-manganese oxide ($CeMnO_x$), cerium oxide doped silica, cerium oxide doped yttrium, and cerium oxide doped zirconium oxide.

Meanwhile, a representative secondary antioxidant used in the electrolyte membrane includes a manganese-based catalyst, such as manganese oxide, or a transition metal-based catalyst, such as platinum (Pt). In recent years, various research on addition of a platinum catalyst to the electrolyte membrane for fuel cells has been conducted.

Results of research to date reveal that durability of the electrolyte membrane may become high or low depending on the amount of platinum added to the electrolyte membrane, degree of distribution of the platinum, and microstructure of the platinum. First, a positive effect is that the platinum introduced into the electrolyte membrane converts hydrogen and oxygen crossing over into water before the hydrogen and the oxygen reach electrodes, whereby the amount of water in the electrolyte membrane is increased, proton conductivity is improved, and ultimately performance of the membrane-electrode assembly is improved. In addition, another positive effect is that hydrogen and oxygen crossing over are blocked, whereby generation of radicals is prevented, or hydrogen peroxide generated in the electrolyte membrane is decomposed, whereby chemical durability of the electrolyte membrane is improved. On the other hand, a negative effect is that the platinum introduced into the electrolyte membrane converts hydrogen peroxide into radicals or directly converts oxygen crossing over into radicals, whereby durability of the electrolyte membrane is reduced. In order to improve chemical durability of the electrolyte membrane through introduction of platinum into the electrolyte membrane, therefore, it is important to understand a mechanism of action of the platinum in the electrolyte membrane and to present a solution suitable therefor.

The above information disclosed in this Background section is provided only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

It is an object of the present disclosure to effectively remove hydrogen and oxygen crossing over in an electrolyte membrane, thereby improving chemical durability of the electrolyte membrane.

The objects of the present disclosure are not limited to those described above. The objects of the present disclosure will be clearly understood from the following description and could be implemented by means defined in the claims and a combination thereof.

In one aspect, the present disclosure provides an electrolyte membrane for fuel cells, the electrolyte membrane including a support and a catalyst particle including a catalyst metal supported by the support, the catalyst metal including one selected from the group consisting of a first metal having catalyst activity to generate hydrogen peroxide, a second metal having catalyst activity to decompose hydrogen peroxide, and a combination thereof.

The support may include one selected from the group consisting of: carbon; silica; zeolite; a transition metal selected from the group consisting of group 4B, 5B, 6B, 7B, and 8B transition metals or an oxide or carbide thereof; and a combination thereof.

The support may have a specific surface area of 100 m²/g to 3,000 m²/g and an average particle diameter of 10 nm to 200 nm.

The first metal may include one selected from the group consisting of gold (Au), palladium (Pd), silver (Ag), copper (Cu), nickel (Ni), cobalt (Co), titanium (Ti), iron (Fe), and a combination thereof.

The second metal may include one selected from the group consisting of platinum (Pt), osmium (Os), iridium (Ir), and a combination thereof.

The catalyst particle may include a first catalyst particle having the first metal supported by a support and a second catalyst particle having the second metal supported by a support.

The catalyst particle may include the first metal and the second metal supported by a support.

The first metal and the second metal may have at least one of an independent form, a physically coupled complex form, or an alloy form.

The electrolyte membrane may include the catalyst particle in a content of 0.001 mg/cm² to 0.90 mg/cm².

The catalyst metal may include the first metal and the second metal in a weight ratio of 1:9 to 9:1.

The electrolyte membrane may include a reinforcement layer and an ion transport layer provided on at least one surface of the reinforcement layer, and the ion transport layer may include an ionomer and the catalyst particle dispersed in the ionomer.

The ion transport layer may be provided on each of opposite surfaces of the reinforcement layer, and one of the ion transport layers may include a first metal and a second metal.

The ion transport layer may be provided on each of opposite surfaces of the reinforcement layer, the ion transport layer on one of the opposite surfaces of the reinforcement layer may include a first metal and a second metal, and the ion transport layer on the other of the opposite surfaces of the reinforcement layer may include a first metal and a second metal, may include a second metal alone, or may include a second metal in a larger amount than a first metal.

The ion transport layer may be provided on at least one surface of the reinforcement layer so as to include a plurality of layers, and at least one of the plurality of layers may include the catalyst particle.

A layer close to the reinforcement layer, among the plurality of layers, may include a first metal, and a layer distant from the reinforcement layer, among the plurality of layers, may include a second metal.

In another aspect, the present disclosure provides a method of manufacturing an electrolyte membrane for fuel cells, the method including preparing a solution including the catalyst particle and forming an ion transport layer on at least one surface of a reinforcement layer using the solution.

The ion transport layer may be provided on each of opposite surfaces of the reinforcement layer, and one of the ion transport layers may include a first metal and a second metal.

The ion transport layer may be provided on each of opposite surfaces of the reinforcement layer, the ion transport layer on one of the opposite surfaces of the reinforcement layer may include a first metal and a second metal, and the ion transport layer on the other of the opposite surfaces of the reinforcement layer may include a first metal and a second metal or comprises a second metal.

The ion transport layer may be provided on at least one surface of the reinforcement layer so as to include a plurality of layers, and at least one of the plurality of layers may include the catalyst particle.

A layer close to the reinforcement layer, among the plurality of layers, may include a first metal, and a layer distant from the reinforcement layer, among the plurality of layers, may include a second metal.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
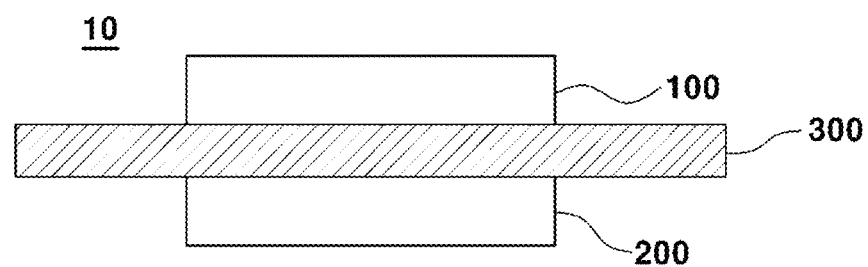
FIG. 1 is a sectional view schematically showing a membrane-electrode assembly according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The objects described above, and other objects, features and advantages will be clearly understood from the following preferred embodiments with reference to the attached drawings. However, the present disclosure is not limited to the embodiments and will be embodied in different forms. The embodiments are suggested only to offer thorough and complete understanding of the disclosed contents and sufficiently inform those skilled in the art of the technical concept of the present disclosure.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

FIG. 1 is a sectional view schematically showing a membrane-electrode assembly (MEA) 10 according to the present disclosure. Referring to this figure, the membrane-electrode assembly 10 includes a cathode 100, an anode 200, and an electrolyte membrane 300 interposed therebetween.

The cathode 100 reacts with oxygen in air, and the anode 200 reacts with hydrogen. Specifically, the anode 200 decomposes hydrogen into protons and electrons through hydrogen oxidation reaction (HOR). The protons move to the cathode 100 through the electrolyte membrane 300, which contacts the anode 200. The electrons move to the cathode 100 through an external wire (not shown).

Each of the cathode 100 and the anode 200 may include a catalyst, such as carbon-supported platinum. In addition, an ion conductive polymer may be included in order to conduct protons therein.

Figure 2:
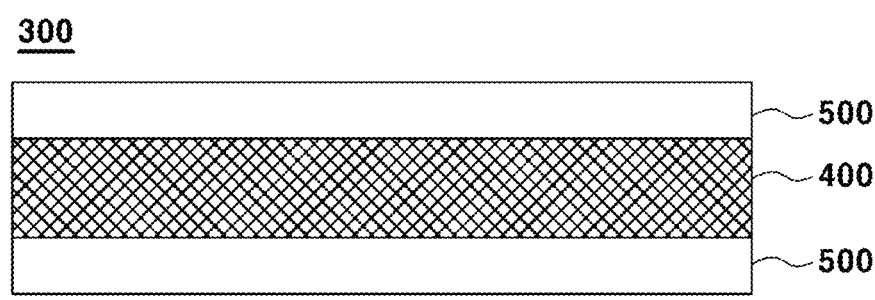
FIG. 2 is a sectional view schematically showing an electrolyte membrane according to the present disclosure.

FIG. 2 is a sectional view schematically showing an electrolyte membrane 300 according to the present disclosure. Referring to this figure, the electrolyte membrane 300 may include a porous reinforcement layer 400 and an ion transport layer 500 provided on at least one surface of the reinforcement layer 400.

The reinforcement layer 400 increases mechanical rigidity of the electrolyte membrane 300. The electrolyte membrane 300 may be selected from the group consisting of polytetrafluoroethylene (PTFE), expanded polytetrafluoroethylene (e-PTFE), polyethylene (PE), polypropylene (PP), polyphenylene oxide (PPO), polybenzimidazole (PBI), polyimide (PI), polyvinylidene fluoride (PVdF), polyvinyl chloride (PVC), and a combination thereof, and may be a porous membrane having a plurality of pores.

The reinforcement layer 400 may be impregnated with an ionomer, a description of which will follow.

The ion transport layer 500 includes an ionomer. Any ionomer may be included as long as the ionomer is a material capable of transferring protons. For example, a perfluorinated sulfonic acid ionomer (PFSA) may be included.

Figure 3:
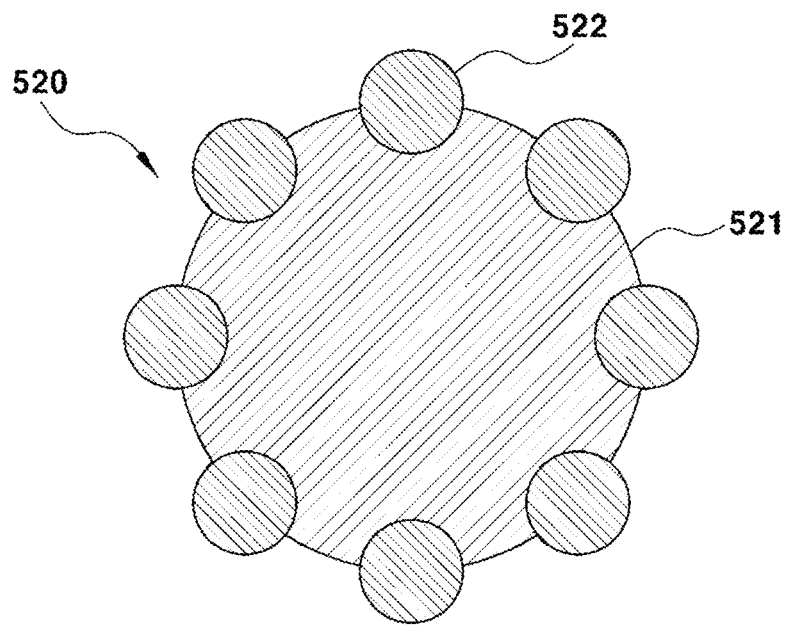
FIG. 3 is a view schematically showing a catalyst particle according to the present disclosure.

The ion transport layer 500 may include catalyst particles dispersed in the ionomer. FIG. 3 schematically shows one of the catalyst particles, denoted by 520. Referring to this figure, the catalyst particle 520 may include a support 521 and a catalyst metal 522 supported by the support 521.

The support 521 is not particularly restricted, and may include one selected from the group consisting of: carbon; silica; zeolite; a transition metal selected from the group consisting of group 4B, 5B, 6B, 7B, and 8B transition metals or an oxide or carbide thereof; and a combination thereof.

The support 521 may have a large specific surface area. As described above, a catalyst may be added to the cathode 100 and/or the anode 200. However, the support 521 according to the present disclosure may have a larger specific surface area than the support of the catalyst used in the electrode described above. Specifically, the support used in the electrode must be highly graphitized so as to withstand carbon corrosion rapidly occurring when the electrode is exposed to a high potential exceeding 1V. Since graphitization and specific surface area are factors that conflict with each other, however, it is substantially difficult to obtain a support that has a large specific surface area while being highly graphitized. The inventors of the present application have found that, since it is sufficient to withstand a potential difference of about 0 to 1V in an electrolyte membrane, a support having a large specific surface area can be used irrespective of graphitization. The support 521 according to the present disclosure has a specific surface area of 100 m$^2$/g to 3,000 m$^2$/g, specifically 500 m$^2$/g to 3,000 m$^2$/g, more specifically 800 m$^2$/g to 3,000 m$^2$/g. Consequently, the support 521 may support a high content of catalyst metal.

The catalyst metal 522 may include one selected from the group consisting of a first metal 522A having catalyst activity to generate hydrogen peroxide, a second metal 522B having catalyst activity to decompose hydrogen peroxide, and a combination thereof. The catalyst metal 522 may include both the first metal 522A and the second metal 522B.

Figure 4:
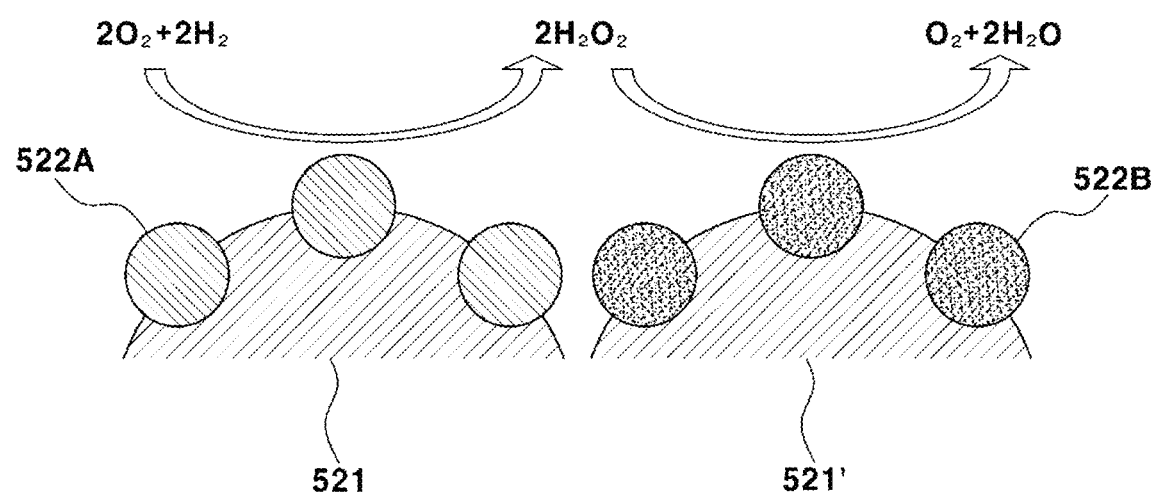
FIG. 4 is a reference view illustrating a mechanism of action of the catalyst particle according to the present disclosure in an electrolyte membrane.

FIG. 4 is a reference view illustrating a mechanism of action of the catalyst particle 520 in the electrolyte membrane 300. FIG. 4 shows that the first metal 522A and the second metal 522B are supported by different supports 521 and 521'. However, the present disclosure is not limited thereto. The same mechanism may be applied even in the case in which the first metal 522A and the second metal 522B are supported by the same support 521.

Referring to this figure, hydrogen ($H_2$) and oxygen ($O_2$) crossing over from the cathode to the anode and from the anode to the cathode react with each other into hydrogen peroxide ($H_2O_2$) due to the first metal 522A having catalyst activity to generate hydrogen peroxide. The hydrogen peroxide ($H_2O_2$) is immediately decomposed into hydrogen ($H_2$) and oxygen ($O_2$) due to the adjacent second metal 522B. The reason for this is that the second metal 522B has catalyst activity to decompose hydrogen peroxide.

Conventionally, platinum (Pt) is added in order to remove hydrogen peroxide generated in the electrolyte membrane, as previously described. However, platinum (Pt) has a low ability to react hydrogen and oxygen into hydrogen peroxide, although the ability thereof to remove hydrogen peroxide is high.

The present disclosure further improves reaction of hydrogen and oxygen and the mechanism of action of platinum in the electrolyte membrane based on sufficient understanding thereof. Specifically, both the first metal 522A having catalyst activity to generate hydrogen peroxide and the second metal 522B having catalyst activity to decompose hydrogen peroxide are used in order to more effectively remove hydrogen and oxygen crossing over in the electrolyte membrane.

The first metal 522A may include one selected from the group consisting of gold (Au), palladium (Pd), silver (Ag), copper (Cu), nickel (Ni), cobalt (Co), titanium (Ti), iron (Fe), and a combination thereof.

The second metal 522B may include one selected from the group consisting of platinum (Pt), osmium (Os), iridium (Ir), and a combination thereof.

Palladium (Pd) may be used as the first metal 522A, and platinum (Pt) may be used as the second metal 522B. Since a polymer electrolyte membrane fuel cell (PEMFC), which is used for vehicles, is operated in an acidic environment, catalysts must exhibit high resistance to acid. In the case in which palladium (Pd), which exhibits high resistance to acid and higher selectivity for hydrogen peroxide generation than platinum (Pt), is used, therefore, it is possible to more effectively remove hydrogen and oxygen crossing over in the electrolyte membrane.

Figure 5:
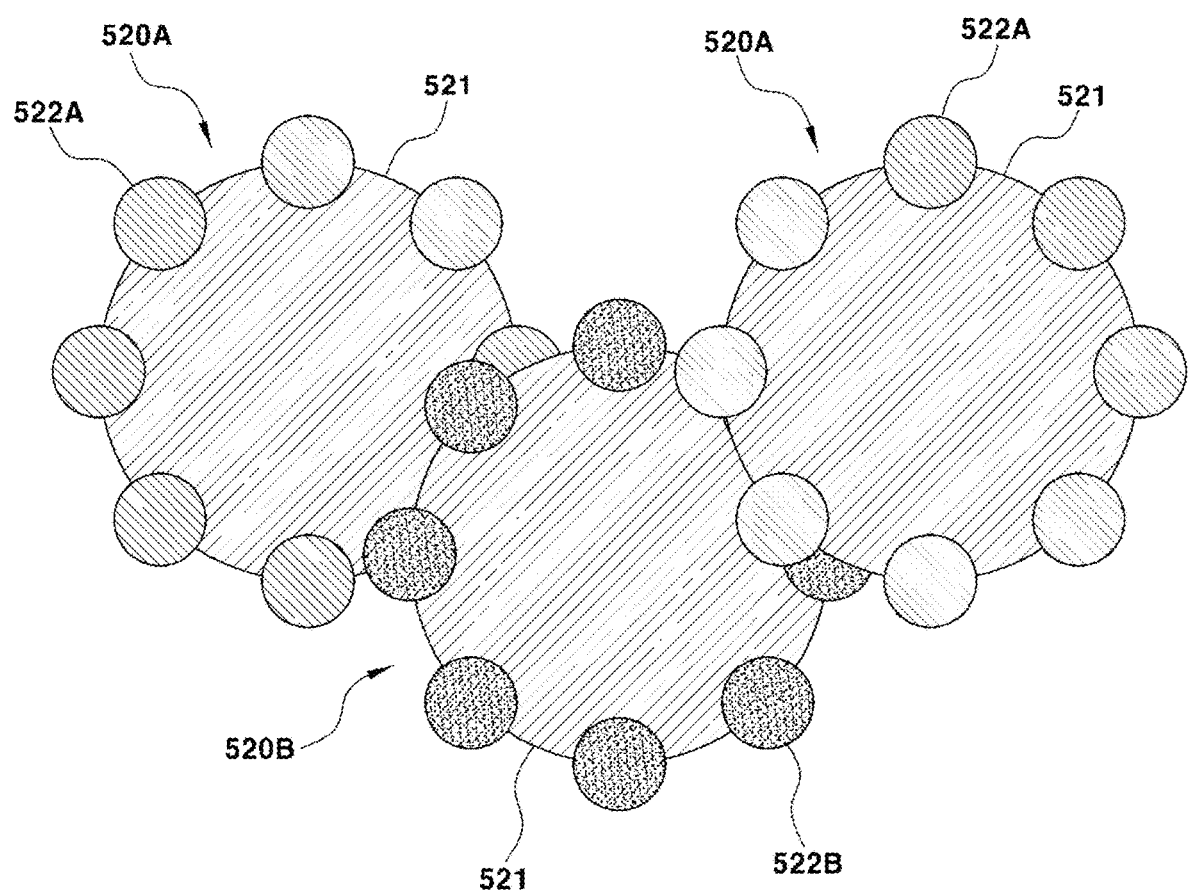
FIG. 5 is a view showing an embodiment of the catalyst particle according to the present disclosure, where the catalyst particle includes a first catalyst particle having a first metal supported by a support and a second catalyst particle having a second metal supported by a support in a mixed state.

FIGS. 5 and 6 show various embodiments of the catalyst particle 520.

FIG. 5 is a view showing a catalyst particle 520 including a first catalyst particle 520A having the first metal 522A supported by a support 521 and a second catalyst particle 520B having the second metal 522B supported by a support 521 in a mixed state.

Figure 6A:
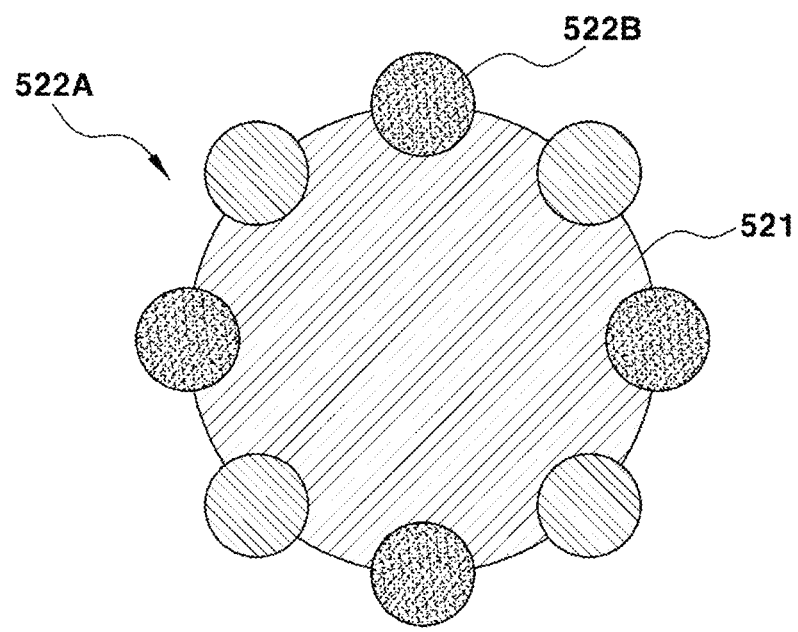
FIG. 6A is a view showing another embodiment of the catalyst particle according to the present disclosure, where a first metal and a second metal are independently supported by a support.
Figure 6B:
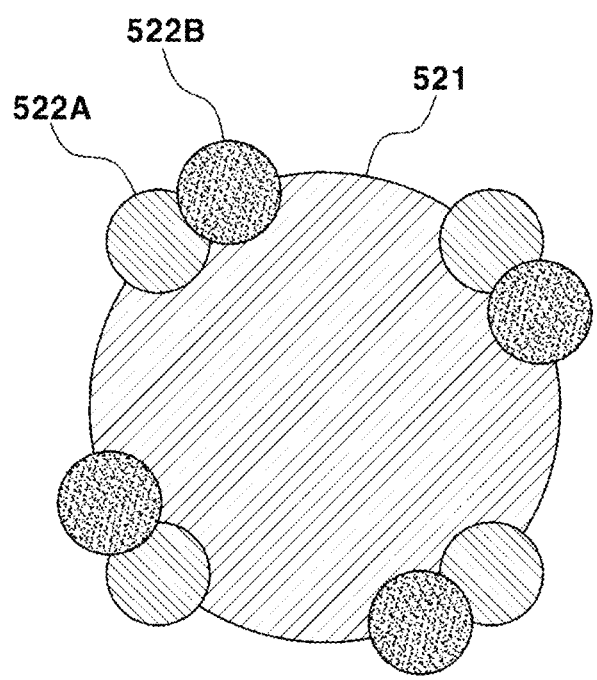
FIG. 6B is a view showing another embodiment of the catalyst particle according to the present disclosure, where a first metal and a second metal are supported by a support in the form of a physical complex.
Figure 6C:
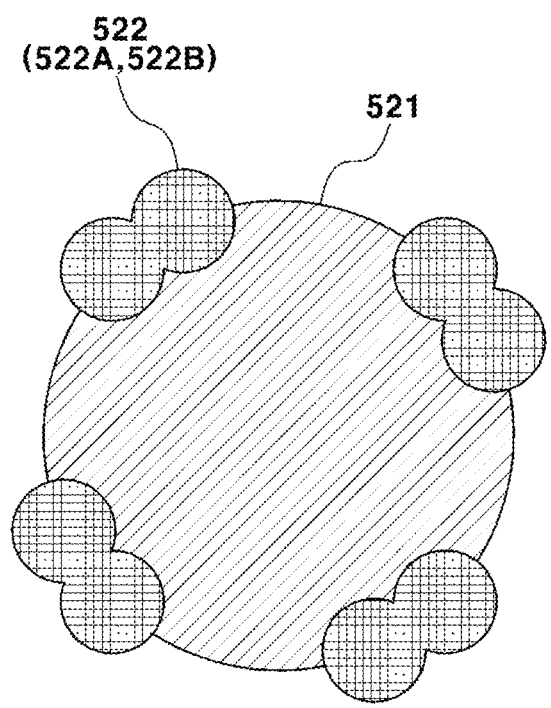
FIG. 6C is a view showing a further embodiment of the catalyst particle according to the present disclosure, where a first metal and a second metal are supported by a support in the form of an alloy.

FIGS. 6A to 6C show a catalyst particle 520 including a first metal 522A and a second metal 522B supported by the same support 521. At this time, the first metal 522A and the second metal 522B may have at least one of an independent form, a physically coupled complex form, or an alloy form.

FIG. 6A is a view showing that the first metal 522A and the second metal 522B are independently supported by the support 521. FIG. 6B is a view showing that the first metal 522A and the second metal 522B are supported by the support 521 in the form of a physical complex. FIG. 6C is a view showing that the first metal 522A and the second metal 522B are supported by the support 521 in the form of an alloy. In the catalyst particle 520 according to the present disclosure, a first metal 522A and a second metal 522B may be supported by a single support in any of various forms shown in FIGS. 6A to 6C.

The electrolyte membrane 300 may include the catalyst particle 520 in a content of 0.001 mg/cm$^2$ to 0.90 mg/cm$^2$, specifically 0.02 mg/cm$^2$ to 0.40 mg/cm$^2$. If the content of the catalyst particle 520 is too small, the effect of improving chemical durability of the electrolyte membrane may be slight. If the content of the catalyst particle 520 is too large, cost may increase, and it is difficult to secure electrical insulation of the catalyst particle in the electrolyte membrane.

The catalyst metal 522 may include the first metal 522A and the second metal 522B in a weight ratio of 1:9 to 9:1, specifically 2:8 to 8:2, more specifically 2.5:7.5 to 7.5:2.5. If the weight ratio is too small, activity to generate hydrogen peroxide may be insufficient. If the weight ratio is too large, hydrogen peroxide may be excessively generated and some thereof may be converted into radicals.

FIG. 7 shows various embodiments of the electrolyte membrane according to the present disclosure. Each embodiment will be described in detail with reference to a method of manufacturing the same.

For reference, the catalyst metals 522A and 522B described with reference to FIGS. 7A to 7F may be supported by different supports or the same support, as described above. In the latter case, the forms shown in FIGS. 6A to 6C may be variously combined with each other.

In addition, the cathode 100 (not shown in FIG. 7) is located above the electrolyte membrane 300 shown in FIGS.

7A to 7F, and the anode 200 (not shown in FIG. 7) is located under the electrolyte membrane 300.

Figure 7A:
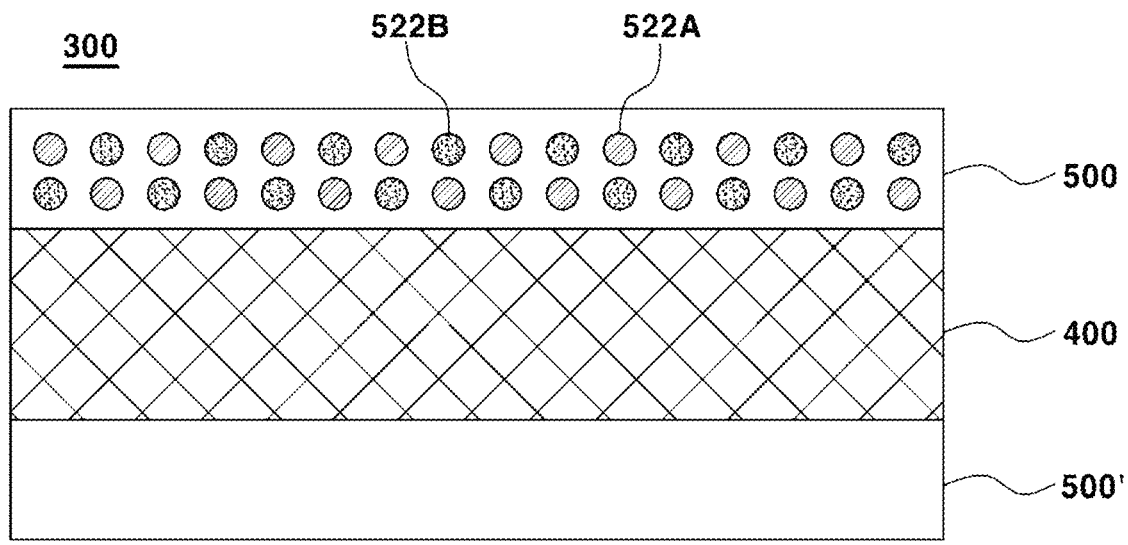
FIG. 7A is a view showing an embodiment of the electrolyte membrane according to the present disclosure, where the electrolyte membrane is configured such that ion transport layers are provided on opposite surfaces of a reinforcement layer and one of the ion transport layers includes a first metal and a second metal.

FIG. 7A is a view showing an electrolyte membrane 300 configured such that ion transport layers 500 and 500' are provided on opposite surfaces of a reinforcement layer 400 and the ion transport layer 500 includes a first metal 522A and a second metal 522B.

A method of manufacturing the electrolyte membrane 300 shown in FIG. 7A may include a step of applying an ionomer solution to a substrate, a step of providing a porous reinforcement layer to the ionomer solution in order to impregnate the reinforcement layer with an ionomer, a step of adding catalyst particles, each of which includes a first metal and a second metal, as described above, to the ionomer solution and dispersing the catalyst particles, a step of applying the same to the reinforcement layer impregnated with the ionomer, and a step of perform drying and heat treatment. However, the present disclosure is not limited thereto. The sequence of the steps and application may be appropriately changed. Also, it is possible to manufacture the electrolyte membrane 300 using various other methods, such as impregnation or transfer, in addition to application. This is equally applied to the other manufacturing methods, a description of which will follow.

For reference, drying may be performed at a temperature of less than 100° C. for 30 minutes or more. If drying temperature is too high, the ionomer may be thermally decomposed. If drying time is too short, a solvent may not be dried.

In addition, heat treatment may be performed at a temperature of 110° C. or higher for 20 minutes or less. If heat treatment time is too long, the ionomer may be thermally decomposed.

Figure 7B:
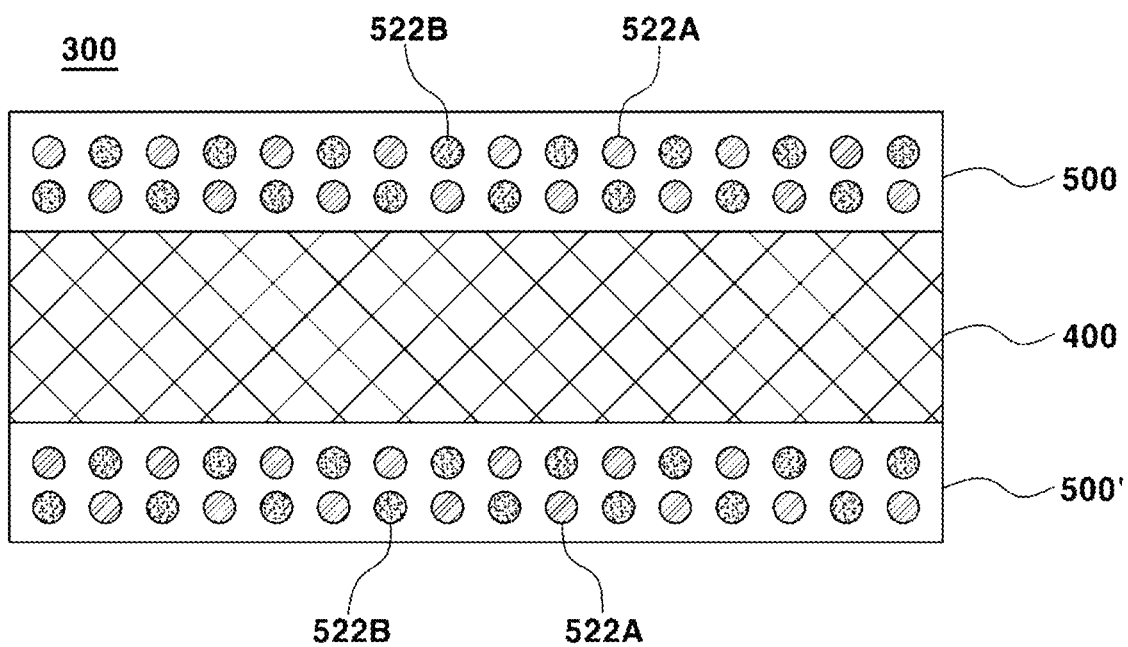
FIG. 7B is a view showing another embodiment of the electrolyte membrane according to the present disclosure, where the electrolyte membrane is configured such that ion transport layers are provided on opposite surfaces of a reinforcement layer and each of the ion transport layers includes a first metal and a second metal.

FIG. 7B is a view showing an electrolyte membrane 300 configured such that ion transport layers 500 and 500' are provided on opposite surfaces of a reinforcement layer 400 and each of the ion transport layers 500 and 500' includes a first metal 522A and a second metal 522B.

Figure 7C:
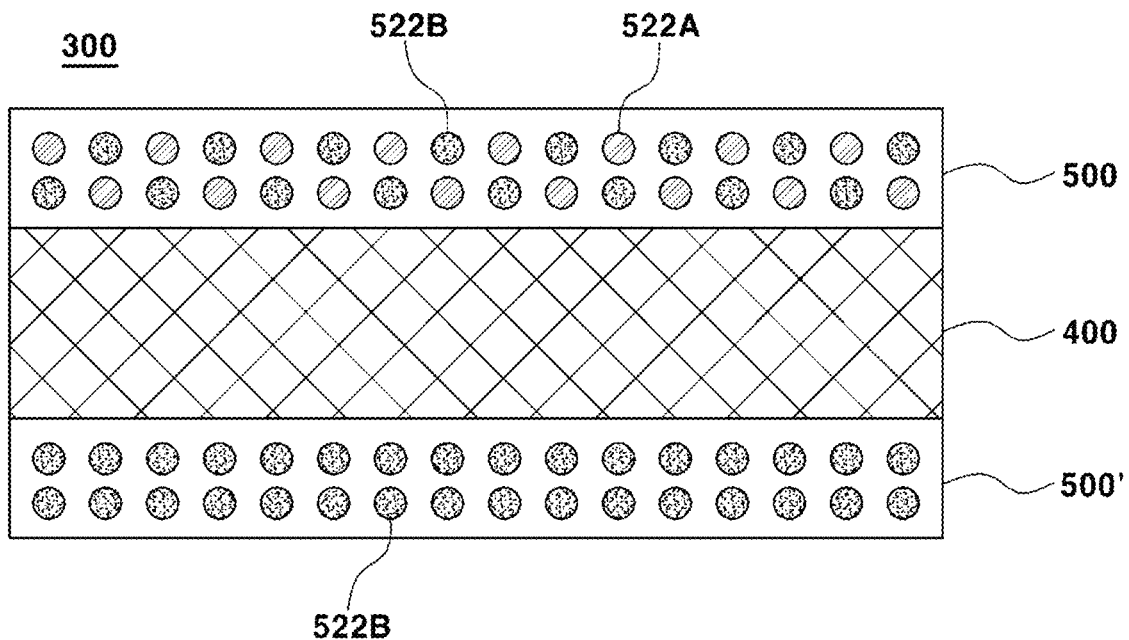
FIG. 7C is a view showing another embodiment of the electrolyte membrane according to the present disclosure, where the electrolyte membrane is configured such that ion transport layers are provided on opposite surfaces of a reinforcement layer and one of the ion transport layers includes a first metal and a second metal while the other ion transport layer includes a second metal alone.

FIG. 7C is a view showing an electrolyte membrane 300 configured such that ion transport layers 500 and 500' are provided on opposite surfaces of a reinforcement layer 400 and the ion transport layer 500 includes a first metal 522A and a second metal 522B while the ion transport layer 500' includes a second metal 522B alone.

Figure 7D:
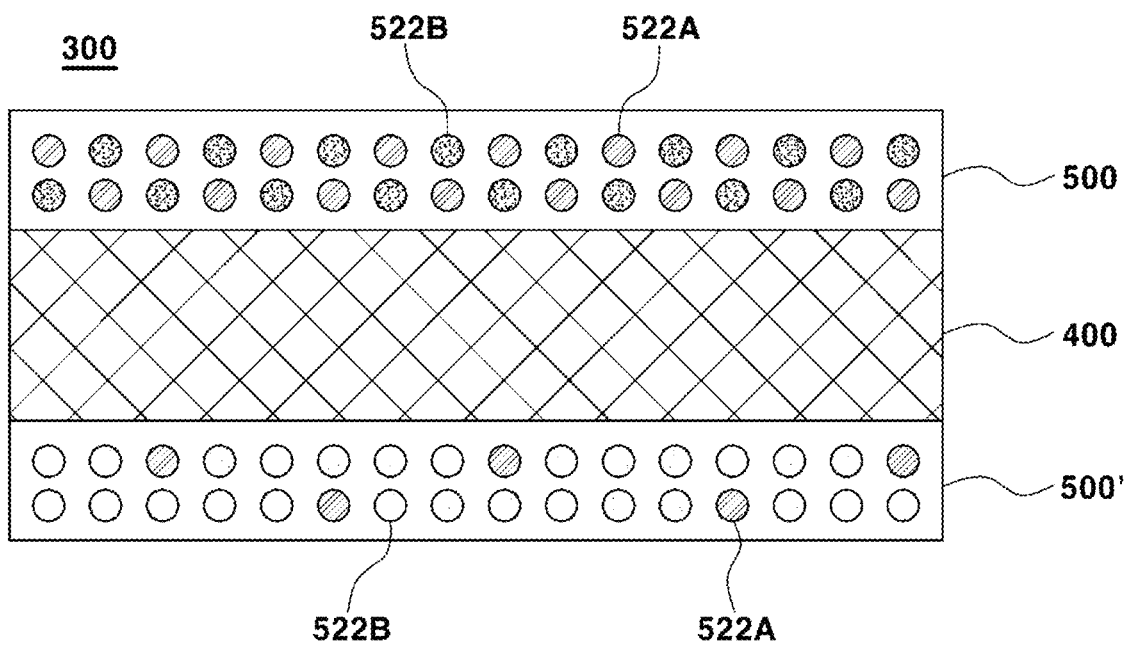
FIG. 7D is a view showing another embodiment of the electrolyte membrane according to the present disclosure, where the electrolyte membrane is configured such that ion transport layers are provided on opposite surfaces of a reinforcement layer and one of the ion transport layers includes a first metal and a second metal while the other ion transport layer includes a first metal and a second metal, the amount of which is greater than the amount of the first metal.

FIG. 7D is a view showing an electrolyte membrane 300 configured such that ion transport layers 500 and 500' are provided on opposite surfaces of a reinforcement layer 400 and the ion transport layer 500 includes a first metal 522A and a second metal 522B while the ion transport layer 500' includes a first metal and a second metal 522B, the amount of which is greater than the amount of the first metal 522A.

In each of the electrolyte membranes shown in FIGS. 7C and 7D, the ion transport layer 500' on the anode side includes the second metal 522B having catalyst activity to decompose hydrogen peroxide alone or in an excessive amount. Voltage of the ion transport layer near the anode approximates to 0V, i.e. the voltage there is low. In this case, the probability of generating hydrogen peroxide increases as represented by the following chemical equation:

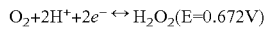

Preferably, therefore, only the second metal 522B or a smaller amount of the second metal 522B than the first metal 522A is added to the ion transport layer 500' on the anode side, as in the electrolyte membrane shown in FIGS. 7C and 7D.

A method of manufacturing each of the electrolyte membranes 300 shown in FIGS. 7B to 7D may include a step of adding catalyst particles, each of which includes a first metal and a second metal, to an ionomer solution and dispersing the catalyst particles in order to prepare a first solution, a step of applying the first solution to a substrate and providing a porous reinforcement layer to the same in order to impregnate the reinforcement layer with the first solution, a step of adding catalyst particles, each of which includes a first metal and/or a second metal in an appropriate state to obtain the ion transport layer 500' shown in each of FIGS. 7B to 7D, to an ionomer solution and dispersing the catalyst particles in order to prepare a second solution, a step of applying the second solution to the reinforcement layer impregnated with the first solution, and a step of performing drying and heat treatment. Drying and heat treatment are performed under the same conditions as described above.

Figure 7E:
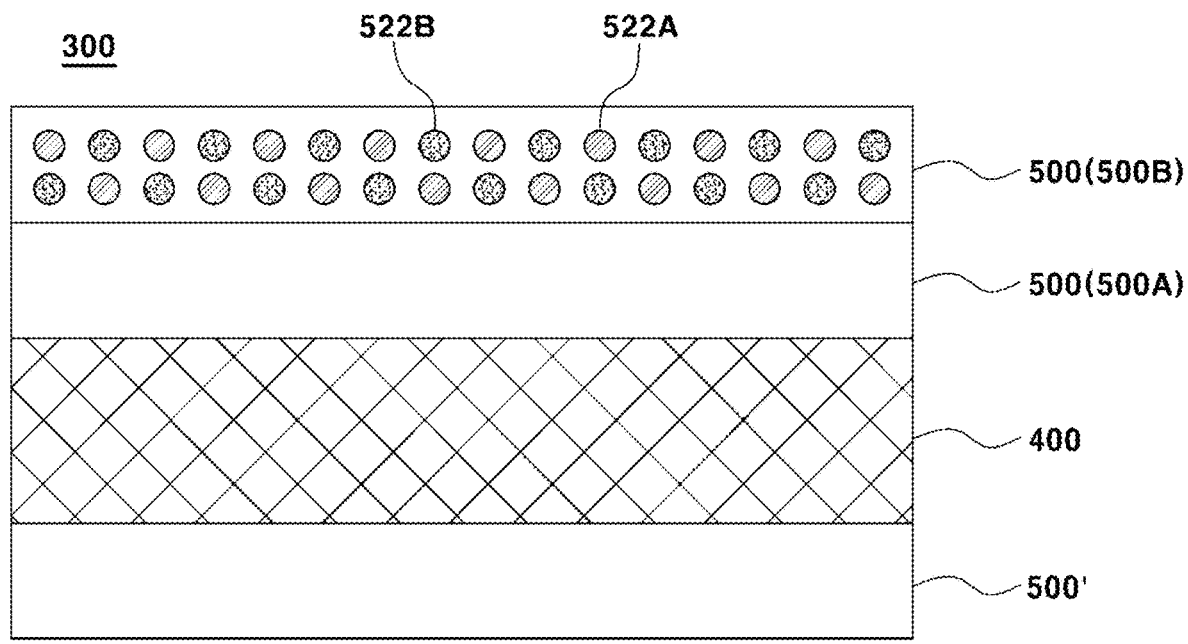
FIG. 7E is a view showing another embodiment of the electrolyte membrane according to the present disclosure, where the electrolyte membrane is configured such that an ion transport layer including a plurality of layers is provided on at least one surface of a reinforcement layer and one of the layers includes a first metal and a second metal.

FIG. 7E is a view showing an electrolyte membrane 300 configured such that an ion transport layer 500 including a plurality of layers 500A and 500B is provided on at least one surface of a reinforcement layer 400 and one of the layers includes a first metal 522A and a second metal 522B.

In the case in which the electrolyte membrane 300 is configured as described above, it is possible to more easily manufacture the electrolyte membrane.

A method of manufacturing the electrolyte membrane 300 shown in FIG. 7E may include a step of preparing an electrolyte membrane manufactured using a conventional method, a step of adding catalyst particles, each of which includes a first metal and a second metal, to an ionomer solution and dispersing the catalyst particles, a step of applying the same to the electrolyte membrane, and a step of perform drying and heat treatment. Here, the electrolyte membrane manufactured using the conventional method may be configured such that one surface of a porous reinforcement layer is impregnated with an ionomer solution and the ionomer solution is applied to the other surface thereof. In addition, the ionomer solution having the catalyst particles added thereto and dispersed therein may not be applied to the electrolyte membrane, but a layer may be formed using the above solution and then the layer may be transferred to the electrolyte membrane.

Figure 7F:
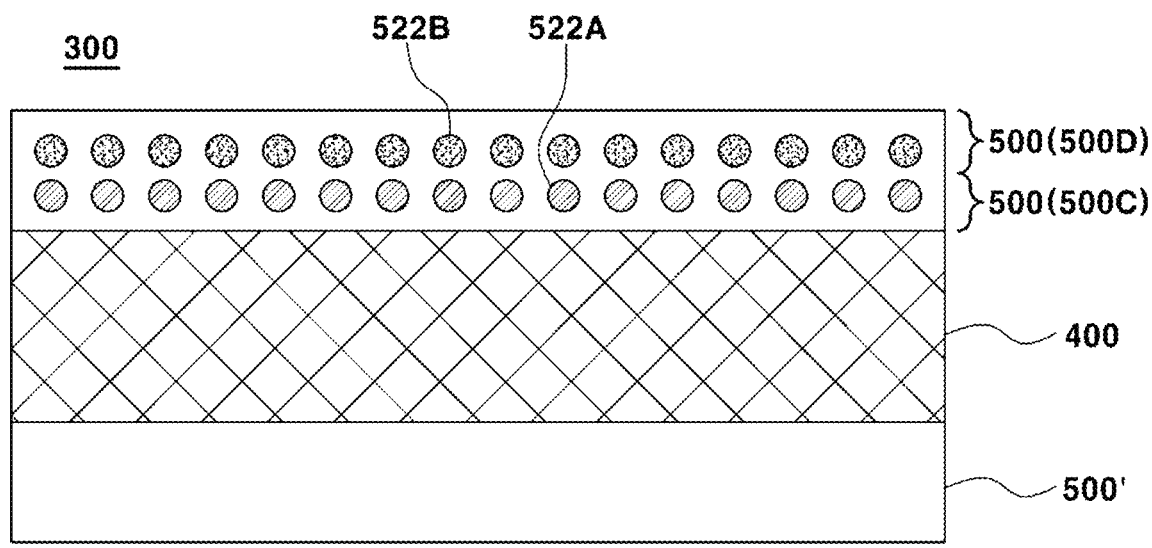
FIG. 7F is a view showing a further embodiment of the electrolyte membrane according to the present disclosure, where the electrolyte membrane is configured such that an ion transport layer including a plurality of layers is provided on at least one surface of a reinforcement layer and one layer close to the reinforcement layer includes a first metal while the other layer distant from the reinforcement layer includes a second metal.

FIG. 7F is a view showing an electrolyte membrane 300 configured such that an ion transport layer 500 including a plurality of layers 500C and 500D is provided on at least one surface of a reinforcement layer 400 and the layer 500C close to the reinforcement layer 400 includes a first metal 522A while the layer 500D distant from the reinforcement layer 400 includes a second metal 522B. Here, the layers 500C and 500D of the ion transport layer 500 may be physically separated from each other, or may be arbitrarily partitioned from each other due to different components thereof, although the layers constitute a single layer. In addition, for example, the layer 500C close to the reinforcement layer 400 may mean a region from the surface of the reinforcement layer 400 to a height equivalent to about ⅓ of the thickness of the ion transport layer 500 in the section of the electrolyte membrane 300, although there is no particular criterion. At this time, the layer 500D distant from the reinforcement layer 400 may mean the remaining region.

A method of manufacturing the electrolyte membrane 300 shown in FIG. 7F may include a step of applying an ionomer solution to a substrate, a step of providing a porous reinforcement layer to the ionomer solution in order to impregnate the reinforcement layer with an ionomer, a step of adding catalyst particles, each of which includes a first metal 522A, to the ionomer solution and dispersing the catalyst particles, a step of applying the same to the reinforcement layer impregnated with the ionomer, a step of perform drying, a step of adding catalyst particles, each of which includes a second metal 522B, to the ionomer solution and dispersing the catalyst particles, a step of applying the same to the dried reinforcement layer, and a step of performing drying and heat treatment.

Various embodiments of the electrolyte membrane 300 according to the present disclosure have been described above. However, the essence of the present disclosure is to add both the first metal 522A having catalyst activity to generate hydrogen peroxide and the second metal 522B has catalyst activity to decompose hydrogen peroxide to the ion transport layer 500, whereby it is possible to more effectively remove hydrogen and oxygen crossing over in the electrolyte membrane than conventionally. It is obvious that changes in design from the above embodiments may be easily derived from the present disclosure and fall within the scope of the present disclosure as long as having the above objects and effects.

Hereinafter, the present disclosure will be described in more detail with reference to concrete examples. However, the following examples are merely an illustration to assist in understanding the present disclosure, and the present disclosure is not limited by the following examples.

Examples 1 to 3 and Comparative Examples 1 to 3

An electrolyte membrane having a form shown in FIG. 7A was manufactured. A carbon support having a specific surface area of 800 m²/g and an average particle diameter of 50 nm was used as a support for a catalyst metal. e-PTFE (Expanded PTFE) was used as a reinforcement layer. In addition, catalyst particles (Pd/C) each including a first metal and catalyst particles (Pt/C) each including a second metal were mixed and used. Concrete specifications are shown in the following table.

TABLE 1

| Classification | Thickness [μm] | First metal (Pd) | Second metal (Pt) | Content of first metal [mg/cm²] | Content of second metal [mg/cm²] |
|---|---|---|---|---|---|
| Example 1 | 20 | O | O | 0.005 | 0.005 |
| Example 2 | | O | O | 0.0075 | 0.0025 |
| Example 3 | | O | O | 0.0025 | 0.0075 |
| Comparative Example 1 | | X | X | — | — |
| Comparative Example 2 | | X | O | — | 0.10 |
| Comparative Example 3 | | O | X | 0.10 | — |

Experimental Example 1

Figure 8A:
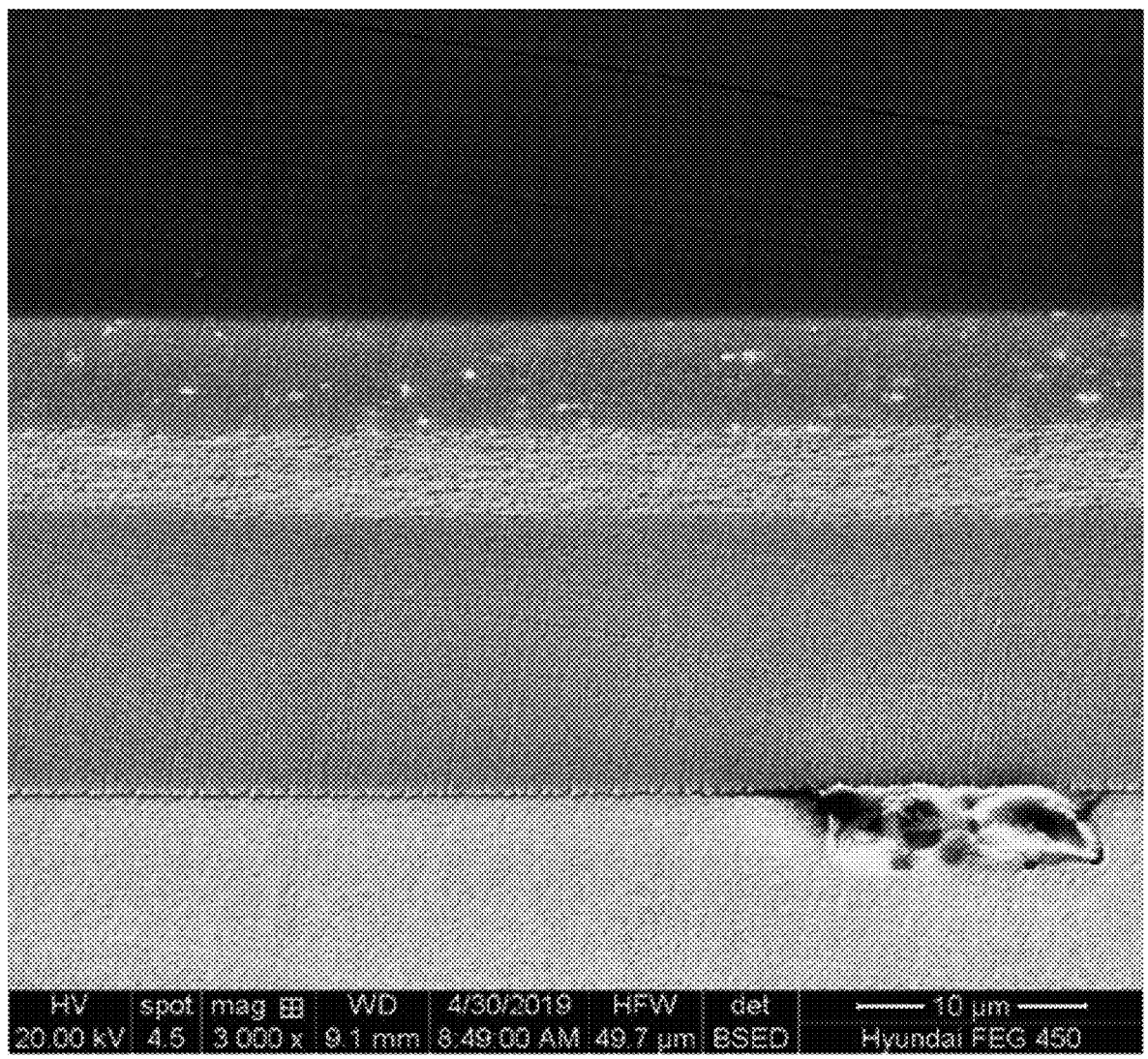
FIGS. 8A, 8B, and 8C are sectional views of electrolyte membranes according to Example 1, Comparative Example 2, and Comparative Example 3, showing results of analysis using scanning electron microscopy (SEM)
Figure 8B:
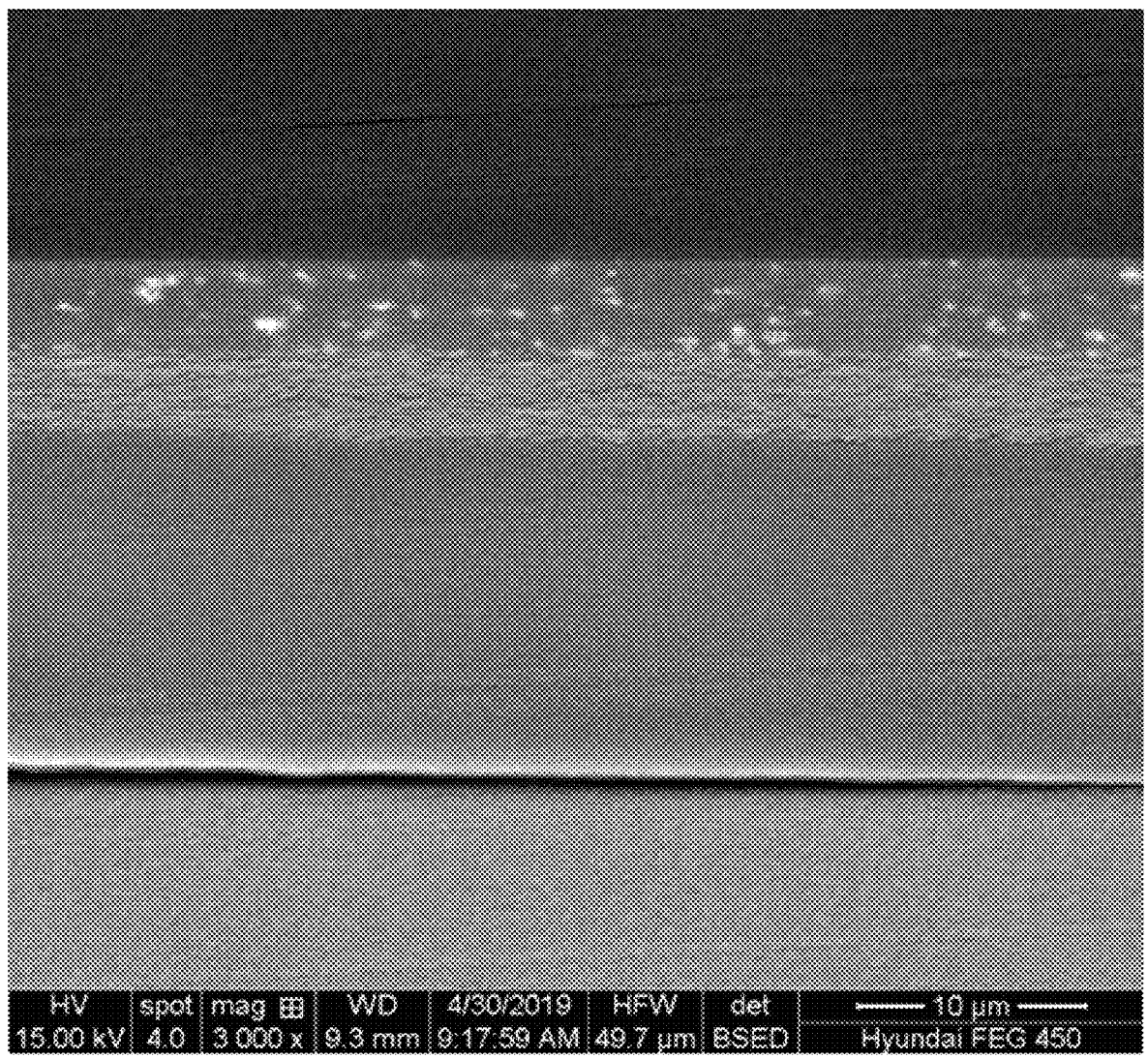
Figure 8C:
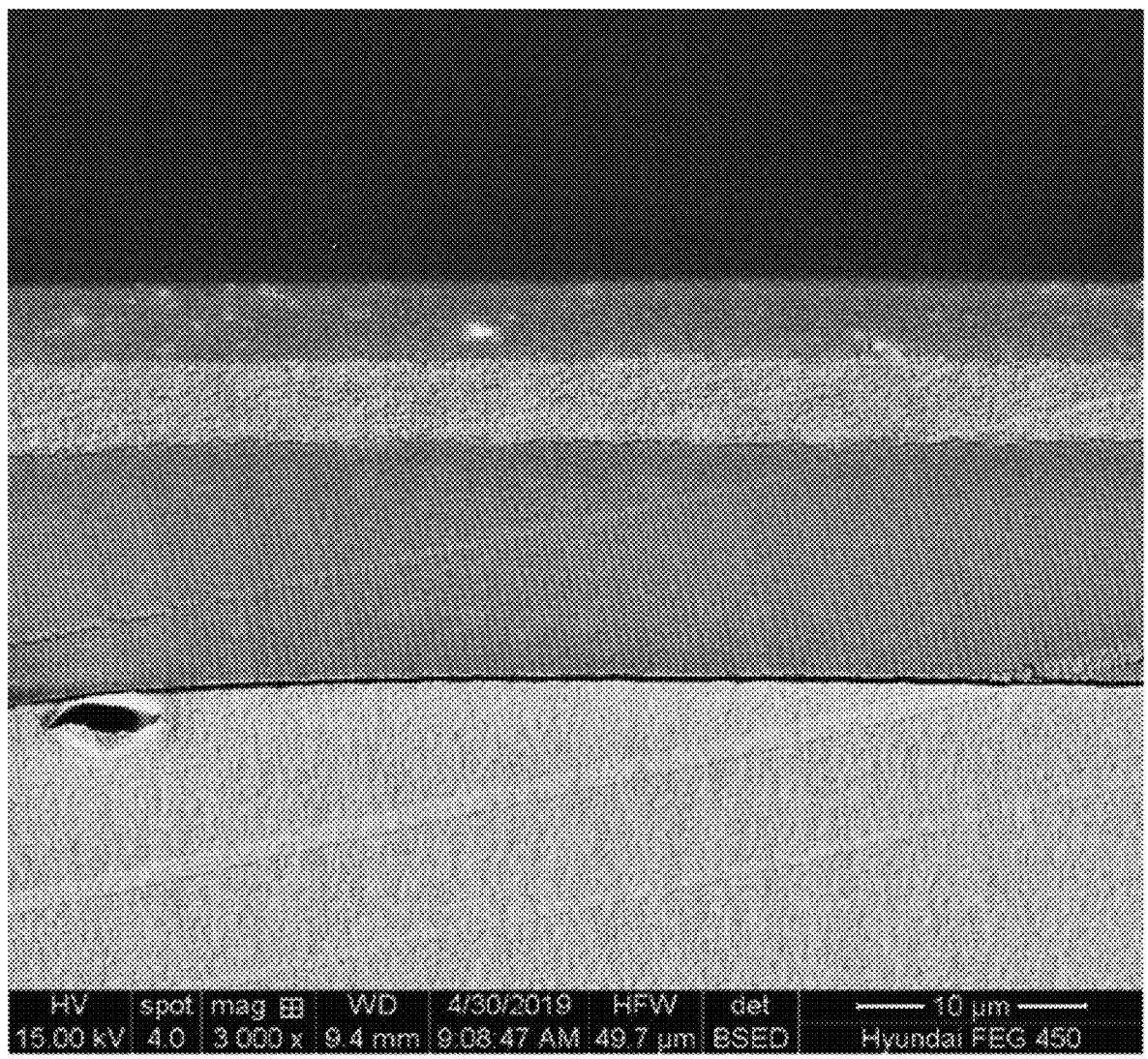

Analysis using scanning electron microscopy (SEM) was performed in order to compare sectional structures of the electrolyte membranes according to Example 1, Comparative Example 2, and Comparative Example 3. Results are shown in FIGS. 8A to 8C.

Referring to these figures, it can be seen that ion transport layers are formed on opposite surfaces of the reinforcement layer and that the catalyst particles are uniformly distributed in one of the ion transport layers.

Experimental Example 2

Figure 9:
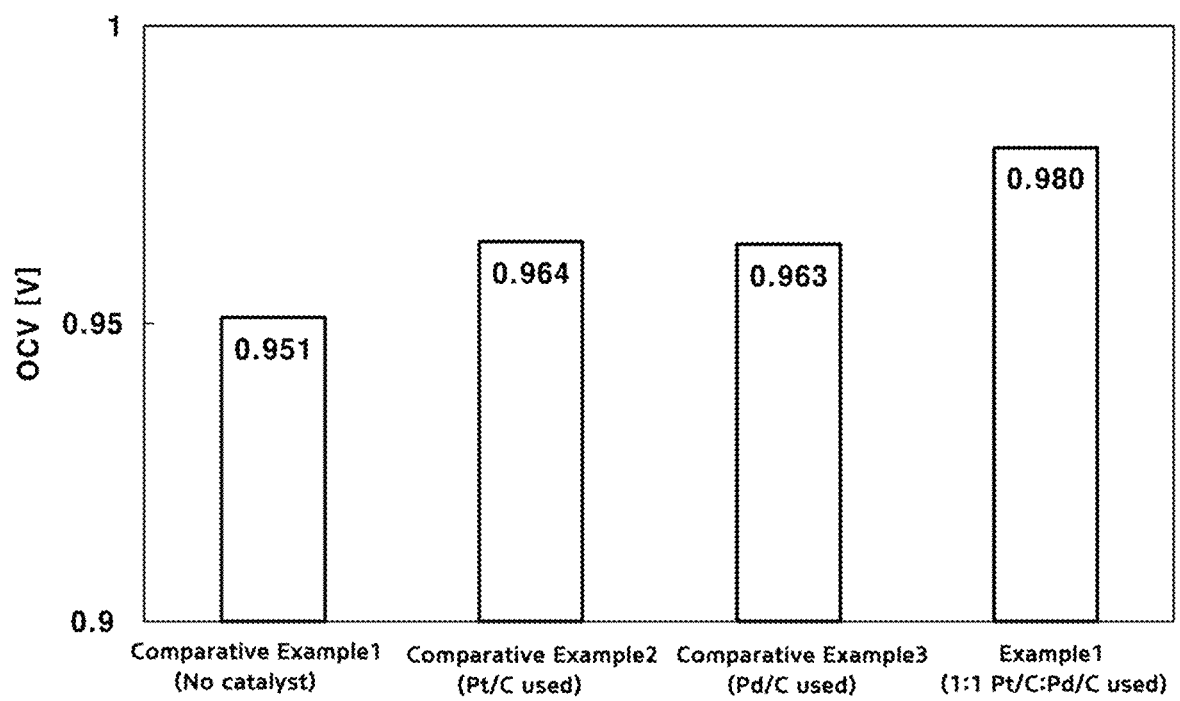
FIG. 9 is a view showing results of measurement of open-circuit voltage of fuel cells including electrolyte membranes according to Example 1 and Comparative Examples 1 to 3.

A cathode and an anode were attached to each of the electrolyte membranes according to Example 1 and Comparative Examples 1 to 3 in order to manufacture a membrane-electrode assembly. Results of measurement of open-circuit voltage of fuel cells are shown in FIG. 9.

Referring to this figure, it can be seen that Example 1 exhibits the highest open-circuit voltage. This means that the electrolyte membrane according to the present disclosure is capable of more effectively removing hydrogen and oxygen crossing over when the fuel cell is operated.

As is apparent from the foregoing, according to the present disclosure, it is possible to more effectively remove hydrogen and oxygen crossing over an electrolyte membrane, whereby it is possible to obtain an electrolyte membrane for fuel cells having improved chemical durability.

The effects of the present disclosure are not limited to those mentioned above. It should be understood that the effects of the present disclosure include all effects that can be inferred from the foregoing description of the present disclosure.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. An electrolyte membrane for fuel cells, the electrolyte membrane comprising:
   a support; and
   a catalyst particle comprising a catalyst metal supported by the support, the catalyst metal comprising a first metal having catalyst activity to generate hydrogen peroxide and a second metal having catalyst activity to decompose hydrogen peroxide;
   wherein the first metal comprises palladium (Pd);
   wherein the second metal comprises platinum (Pt);
   wherein the electrolyte membrane comprises the catalyst particle in a content of 0.001 mg/cm² to 0.90 mg/cm²; and
   wherein the catalyst metal comprises the first metal and the second metal in a weight ratio of 1:9 to 9:1;
   wherein the electrolyte membrane comprises a reinforcement layer and an ion transport layer provided on at least one surface of the reinforcement layer; and
   wherein the ion transport layer comprises an ionomer and the catalyst particle dispersed in the ionomer.

2. The electrolyte membrane according to claim 1, wherein the support comprises one selected from a group consisting of: carbon; silica; zeolite; a transition metal selected from a group consisting of group 4B, 5B, 6B, 7B, and 8B transition metals or an oxide or carbide thereof and a combination thereof.

3. The electrolyte membrane according to claim 1, wherein the support has a specific surface area of 100 m2/g to 3,000 m2/g.

4. The electrolyte membrane according to claim 1, wherein the catalyst particle comprises:
   a first catalyst particle having the first metal supported by a first support; and
   a second catalyst particle having the second metal supported by a second support.

5. The electrolyte membrane according to claim 1, wherein the catalyst particle comprises the first metal and the second metal supported by the support.

6. The electrolyte membrane according to claim 5, wherein the first metal and the second metal have at least one of an independent form, a physically coupled complex form, or an alloy form.

7. The electrolyte membrane according to claim 1, wherein the ion transport layer is provided on each of opposite surfaces of the reinforcement layer, and one of the ion transport layers comprises a first metal and a second metal.

8. The electrolyte membrane according to claim 1, wherein:
the ion transport layer is provided on each of opposite surfaces of the reinforcement layer;
the ion transport layer on one of the opposite surfaces of the reinforcement layer comprises a first metal and a second metal; and
the ion transport layer on the other of the opposite surfaces of the reinforcement layer comprises a first metal and a second metal, comprises a second metal alone, or comprises a second metal in a larger amount than a first metal.

9. The electrolyte membrane according to claim 1, wherein:
the ion transport layer is provided on at least one surface of the reinforcement layer so as to comprise a plurality of layers; and
at least one of the plurality of layers comprises the catalyst particle.

10. The electrolyte membrane according to claim 9, wherein:
a layer proximate the reinforcement layer, among the plurality of layers, comprises a first metal; and
a layer distant from the reinforcement layer, among the plurality of layers, comprises a second metal.

11. A method of manufacturing an electrolyte membrane for fuel cells, the method comprising:
preparing a solution comprising the catalyst particle according to claim 1; and
forming the ion transport layer on at least one surface of the reinforcement layer using the solution.

12. The method according to claim 11, wherein the ion transport layer is provided on each of opposite surfaces of the reinforcement layer, and one of the ion transport layers comprises the first metal and the second metal.

13. The method according to claim 11, wherein:
the ion transport layer is provided on each of opposite surfaces of the reinforcement layer;
the ion transport layer on one of the opposite surfaces of the reinforcement layer comprises the first metal and the second metal; and
the ion transport layer on the other of the opposite surfaces of the reinforcement layer comprises the first metal and the second metal or comprises the second metal.

14. The method according to claim 11, wherein:
the ion transport layer is provided on at least one surface of the reinforcement layer so as to comprise a plurality of layers; and
at least one of the plurality of layers comprises the catalyst particle.

15. The method according to claim 14, wherein:
a layer proximate the reinforcement layer, among the plurality of layers, comprises the first metal; and
a layer distant from the reinforcement layer, among the plurality of layers, comprises the second metal.

16. An electrolyte membrane for fuel cells, the electrolyte membrane comprising:
a support; and
a catalyst particle comprising a catalyst metal supported by the support, the catalyst metal comprising a first metal having catalyst activity to generate hydrogen peroxide and a second metal having catalyst activity to decompose hydrogen peroxide;
wherein the first metal comprises palladium;
wherein the second metal comprises platinum (Pt);
wherein the catalyst metal comprises the first metal and the second metal in a weight ratio of 1:9 to 9:1;
wherein the electrolyte membrane comprises a reinforcement layer and an ion transport layer provided on at least one surface of the reinforcement layer;
wherein the ion transport layer comprises an ionomer and the catalyst particle dispersed in the ionomer; and
wherein in the ion transport layer contacting an anode, only the second metal having a catalytic activity for decomposition of hydrogen peroxide is included, or the second metal is included in excess of the first metal.

* * * * *